Patented Mar. 27, 1934

1,952,661

UNITED STATES PATENT OFFICE 1,952,661

PROCESS OF SEPARATING THE MIXTURES OF ISOMERIC 1.4.5.8-NAPHTHOYLENE-DI-ARYLIMIDAZOLES AND NEW DYESTUFF OBTAINED THEREBY

Wilhelm Eckert, Ernst Fischer, and Otto Braunsdorf, Frankfort - on - the - Main-Hochst, Germany, assignors to General Aniline Works, Inc., New York, N. Y., a corporation of Delaware No Drawing. Application June 30, 1931, Serial No. 548,022. In Germany August 12, 1930

8 Claims. (Cl. 260—44)

The present invention relates to a process of separating the mixtures of isomeric 1.4.5.8-naphthoylene-diarylimidazoles obtainable by condensing a 1.4.5.8-naphthalenetetra-carboxylic acid compound with an ortho-diamine compound of the benzene series into their two components and to new dyestuffs obtained thereby.

We have found that the separation of the dyestuff mixtures obtainable by condensing a 1.4.5.8-naphthalenetetra-carboxylic acid compound with an ortho-diamine compound of the benzene series into their components can be effected with a good yield by converting the said isomeric dyestuffs, in the presence of a suitable organic diluent, for instance, a solvent or a suspending agent, by means of organic acids of the formula

R.SO₂OH wherein R is a member of the benzene and naphthalene series, such as, for instance, para-toluene-sulfonic acid, naphthalene-sulfonic acids, alkyl naphthalene-sulfonic acids, into the corresponding salts and separating the salts from each other by taking advantage of their different solubility. As solvents or suspending agents there may be used, for instance, chlorobenzene, nitrobenzene, glacial acetic acid or the like.

Among the products obtainable according to the present invention those are to be considered as new which have the probable general formula:

wherein R represents the bivalent radical

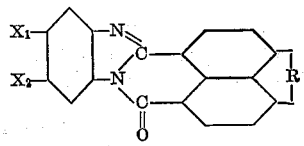

and one X and Y mean hydrogen and the other X and Y mean —CO.CH₃ or —C₆H₅, X₁ being identical with Y₁, and X₂ with Y₂.

The new products dissolve in concentrated sulfuric acid to a brownish-yellow to red solution and dye the vegetable fiber from the vat yellowish brown to violetish brown tints of good fastness properties; their melting points are above 300° C.

The following examples serve to illustrate the invention, but they are not intended to limit it thereto, the parts being by weight:

(1) 10 parts of the dyestuff obtainable by condensing 1.4.5.8-naphthalenetetra-carboxylic acid with 1.2-diamino-benzene according to U. S. Patent 1,588,451 are boiled together with 10 parts of para-toluene-sulfonic acid and about 160 parts of glacial acetic acid, the solid product is filtered by suction and subsequently washed with glacial acetic acid. From the residue on the filter there is obtained the para-toluene-sulfonate of the orange dyestuff of the following probable composition:

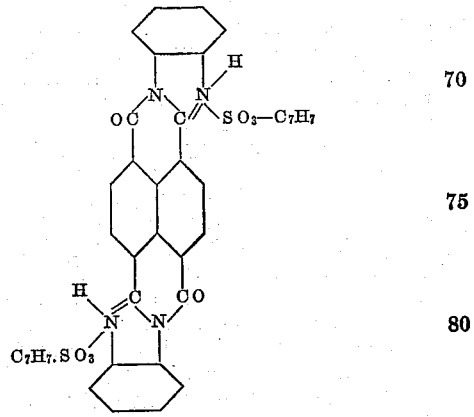

It is a yellowish brown product which is sparingly soluble in many organic solvents, such as chlorobenzene, nitrobenzene, glacial acetic acid or the like. The product is washed with glacial acetic acid and then decomposed by introducing it into water; it is then filtered by suction and washed until neutral. The dyestuff is obtained in the form of an orange powder. It dissolves in monohydrate to a brownish solution and dyes cotton from an olive vat very brilliant orange tints of excellent fastness properties.

In the filtrate obtained there is contained the para-toluene-sulfonate of the bluish red dyestuff which corresponds with the following probable composition:

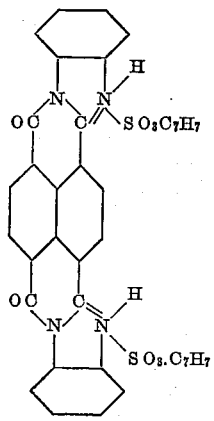

It is decomposed into the dyestuff by means of water; the dyestuff is filtered by suction, washed until neutral and dried. It dissolves in concentrated sulfuric acid to a red solution and dyes cotton from an olive vat bluish red tints of very good fastness properties.

Instead of the free para-toluene-sulfonic acid there may be used a salt thereof, for instance, the sodium salt, with the addition of the quantity of sulfuric acid monohydrate required for liberating the acid.

(2) 10 parts of the dyestuff used as parent material in Example 1 are suspended in about 225 parts of chlorobenzene and 10 parts of free para-toluene-sulfonic acid are added thereto. The mixture is heated for some time to boiling during which operation the para-toluene-sulfonate of the bluish red dyestuff described in Example 1 dissolves and the corresponding salt of the orange dyestuff is precipitated. The hot product is filtered by suction, the residue is boiled again with chlorobenzene and then filtered by suction. The adhering chlorobenzene can be removed by washing with alcohol or by steam distillation. The product is further treated as described in Example 1.

(3) 10 parts of the dyestuff used as parent material in the preceding examples are boiled for a short time in about 120 parts of nitrobenzene and 7—8 parts of a free alkyl-naphthalene-sulfonic acid. After the product has been allowed to cool, the sparingly soluble alkyl-naphthalene-sulfonate of the orange dyestuff is filtered by suction and worked up as described in Example 1.

By using a naphthalene-sulfonic acid instead of the above-named acids, the dyestuffs are likewise easily separated with a good yield.

(4) 10 parts of the dyestuff obtainable by condensing 1.4.5.8-naphthalene-tetra-carboxylic acid with 4-ethoxy-1.2-diaminobenzene according to U. S. Patent 1,588,451 are boiled with 15 parts of para-toluene-sulfonic acid and about 160 parts of glacial acetic acid; the cold product is filtered by suction and subsequently washed with glacial acetic acid. The residue on the filter consists of the para-toluene-sulfonate of a brownish yellow dyestuff and corresponds with the following probable formula:

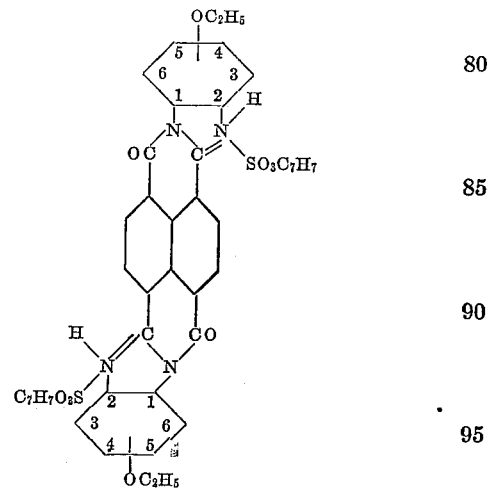

wherein the group —OC₂H₅ stands in 4- or 5-position.

The light brown product very sparingly dissolves in most of the organic solvents. The para-toluene-sulfonate is decomposed with water, and the dyestuff thus obtained is filtered by suction and washed until neutral. The dyestuff dyes cotton from a reddish green dichroic vat green tints which, when the material is exposed to the air, change to brownish-red tints.

In the filtrate obtained as described above there is contained the para-toluene-sulfonate of a brownish violet dyestuff which corresponds with the following probable composition:

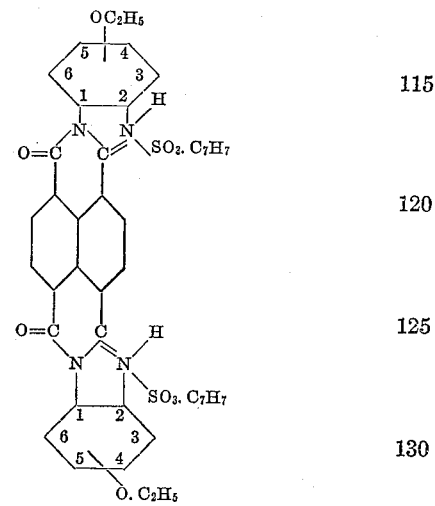

wherein the O.C₂H₅ group stands in 4- or 5-position.

The product is decomposed with water into the toluene-sulfonic acid and the dyestuff. When the dyestuff is dried, it is a brown powder dyeing cotton from a reddish green dichroic vat violet-tinged dark brown tints.

(5) 10 parts of the dyestuff obtainable from 1.4.5.8-naphthalene-tetra-carboxylic acid and 4-chloro-1.2-diamino-benzene yield, if treated as described in Example 1, a sparingly soluble orange toluene-sulfonate. After the decomposition with water, the product yield a brownish yellow dyestuff which dyes cotton from a reddish green clear brownish red tints.

From the filtrate a dyestuff is precipitated by water, which dyes cotton reddish brown tints.

(6) By carrying out the treatment described in the preceding examples with the dyestuff which is obtainable from 1.4.5.8-naphthalene-tetra-carboxylic acid and 3.4-diaminodiphenyl and which correspond with the following probable constitution:

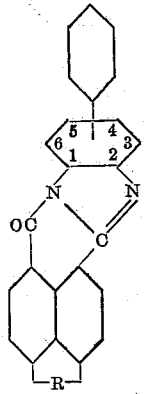

wherein R represents the group

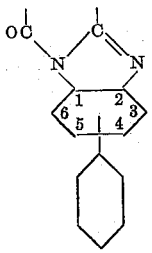

and the group

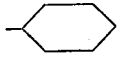

stands in 4- or 5-position in the presence of glacial acetic acid there is obtained a dyestuff from the sparingly soluble para-toluene-sulfonate, which has a reddish-brown color, dissolves in concentrated sulfuric acid to cherry-red solution and dyes cotton from a green vat brownish-red tints. The soluble salt contained in the filtrate yields after its decomposition a violetish brown dyestuff which dissolves in concentrated sulfuric acid to a red solution and dyes cotton from a yellowish green vat violet tinged brown shades. The melting points of the dyestuffs are above 300° C.

(7) By a similar treatment of the dyestuff obtainable from 1.4.5.8-naphthalene-tetra-carboxylic acid and 3.4-diamino-acetophenone and corresponding with the following probable formula:

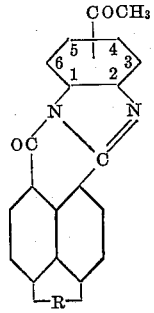

wherein R represents the group

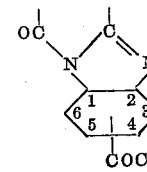

and the group COCH₃ stands in 4- or 5-position in the presence of chlorobenzene there is obtained from the more sparingly soluble toluene-sulfonate a yellowish-brown product which probably corresponds with the transconfiguration and from the other sulfonate a reddish-brown dyestuff which probably corresponds with the cis-configuration. Both dyestuffs dissolve in concentrated sulfuric acid to brownish-yellow solutions and dye cotton from an olive green vat.

4-chloro-1.2-diaminobenzene, 3.4-diaminodiphenyl and 3.4-diaminoacetophenone referred to in the above examples may be prepared from 4-chloro-aniline, 4-amino-diphenyl and 4-amino-acetophenone respectively by conversion into the corresponding acetyl compound, subsequent nitration of the acetyl compound, saponifcation of the nitrated product to produce the corresponding ortho-nitro-amino-derivative and reduction of the latter to the ortho-diamine.

We claim:

1. The process which comprises treating a mixture of isomeric 1.4.5.8-naphthoylene-diarylimidazoles, obtainable by condensing a 1.4.5.8-naphthalene-tetra-carboxylic acid compound with an ortho-diamine compound of the benzene series, with an organic acid of the formula R.SO₂OH wherein R is a member of the benzene and naphthalene series in the presence of an inert organic diluent and separating the mixture of isomeric salts thus obtained into its components by taking advantage of their different solubility.

2. The process which comprises treating a mixture of isomeric 1.4.5.8-naphthoylene-diarylimidazoles, obtainable by condensing 1.4.5.8-naphthalene-tetra-carboxylic acid with 1.2-diaminobenzene, with para-toluene-sulfonic acid in the presence of chlorobenzene and separating the mixture of isomeric salts thus obtained into its components by taking advantage of their different solubility.

3. The process which comprises treating a mixture of isomeric 1.4.5.8-naphthoylene-diarylimidazoles, obtainable by condensing 1.4.5.8-naphthalene-tetra-carboxylic acid with 3.4-diamino-diphenyl, with para-toluene-sulfonic acid in the presence of glacial acetic acid and separating the mixture of isomeric salts thus obtained into its components by taking advantage of their different solubility.

4. The process which comprises treating a mixture of isomeric 1.4.5.8-naphthoylene-diarylimidazoles, obtainable by condensing 1.4.5.8-naphthalene-tetra-carboxylic acid with 3.4-diamino-acetophenone, with para-toluene-sulfonic acid in the presence of chlorobenzene and separating the mixture of isomeric salts thus obtained into its components by taking advantage of their different solubility.

5. The compounds of the general probable formula:

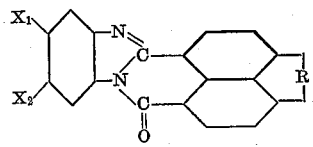

wherein R represents the bivalent radical

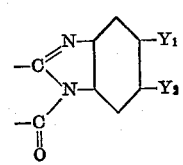

and one X and Y means hydrogen and the other X and Y means —CO.CH$_3$ or —C$_6$H$_5$, X$_1$ being identical with Y$_1$, and X$_2$ with Y$_2$, said products dissolving in concentrated sulfuric acid to a brownish-yellow to red solution, dyeing the vegetable fiber from the vat yellowish-brown to violetish-brown tints of good fastness properties and melting at above 300° C.

6. The compound of the probable formula:

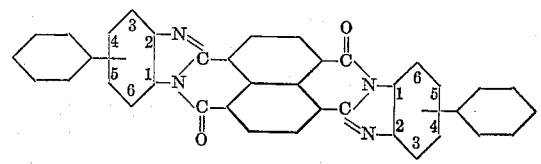

the two groups

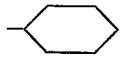

standing in 4- or 5-position, said product having a red-brown color, dissolving in concentrated sulfuric acid to a cherry red solution and dyeing cotton from a green vat reddish-brown tints.

7. The compound of the probable formula:

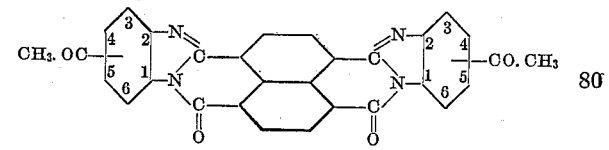

the two groups CO.CH$_3$ standing in 4- or 5-position, said product being a brown powder, dissolving in concentrated sulfuric acid to a brownish-yellow solution, dyeing the vegetable fiber from an olive vat reddish-brown tints and melting at above 300° C.

8. The compound of the probable formula:

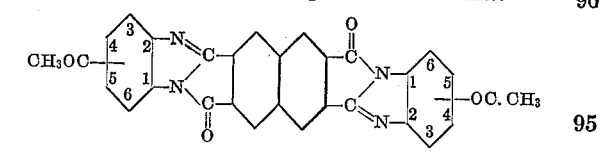

the two groups —CO.CH$_3$ standing in 4- or 5-position, said product being a brown powder, dyeing the vegetable fiber from an olive vat very clear yellowish-brown tints.

WILHELM ECKERT.
ERNST FISCHER.
OTTO BRAUNSDORF.